Figure 3:
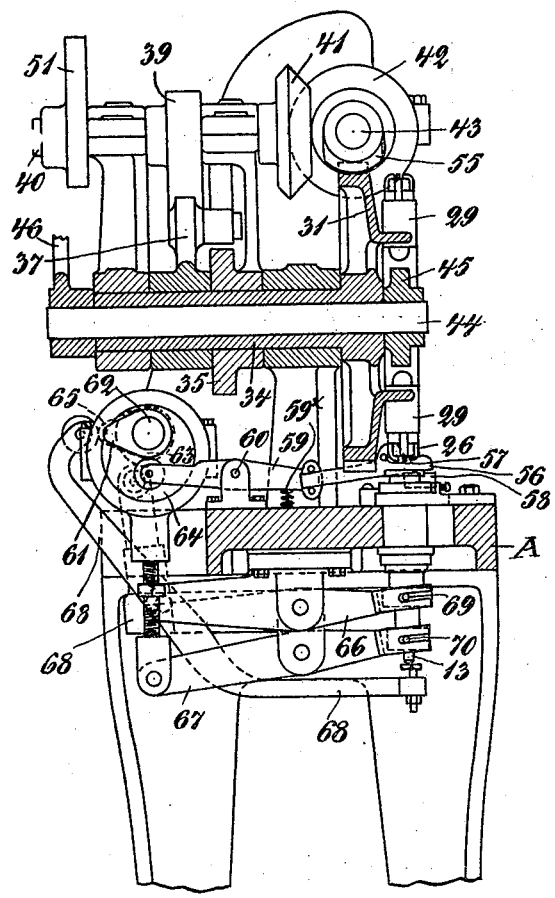

Jan. 1, 1929.
G. C. EKSTRÖM ET AL
1,697,558
MACHINE FOR MAKING BUTTONS AND THE LIKE
Filed Oct. 30, 1924     4 Sheets-Sheet 1
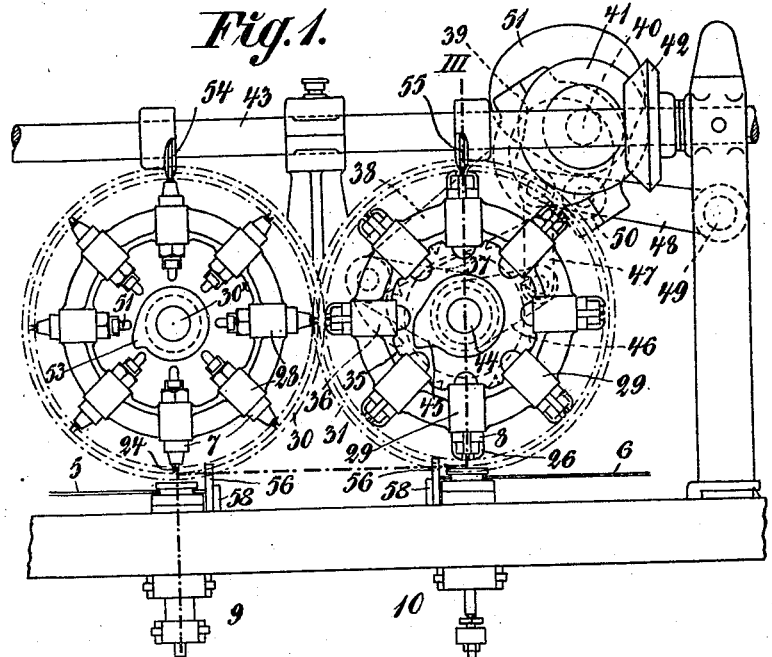
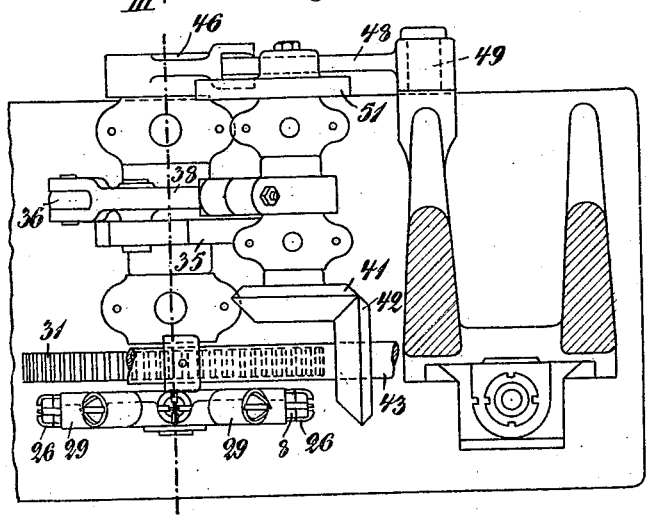
Inventor
G. C. EKSTRÖM AND
B. A. E. JOHNSON.
By Marks & Clerk
Attys.

Jan. 1, 1929.                                                1,697,558
                G. C. EKSTRÖM ET AL
         MACHINE FOR MAKING BUTTONS AND THE LIKE
              Filed Oct. 30, 1924        4 Sheets-Sheet 2

Inventor
G. C. EKSTRÖM. AND
B. A. E. JOHNSON.
By Marks & Clerk

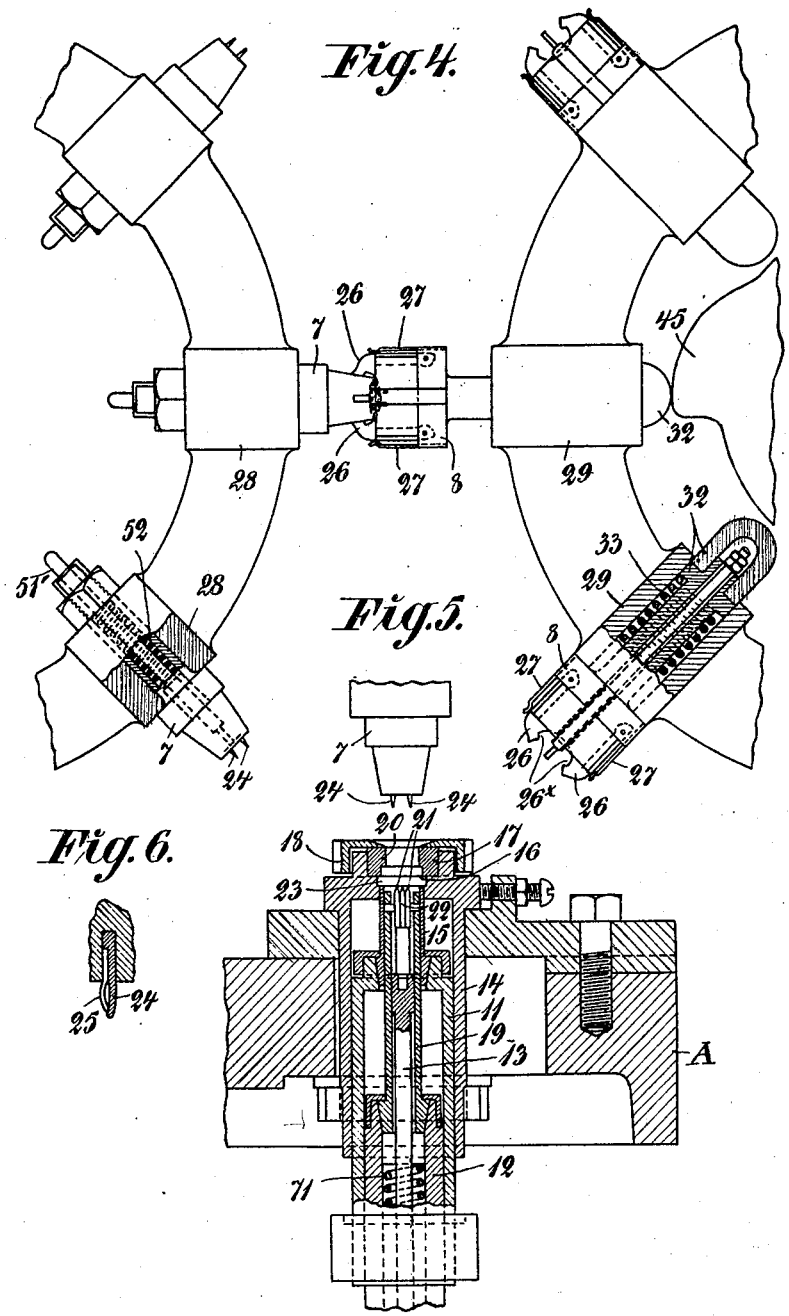

Jan. 1, 1929. 1,697,558
G. C. EKSTRÖM ET AL
MACHINE FOR MAKING BUTTONS AND THE LIKE
Filed Oct. 30, 1924  4 Sheets-Sheet 4
Fig.11.
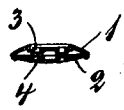
Fig.12.
Fig.7.
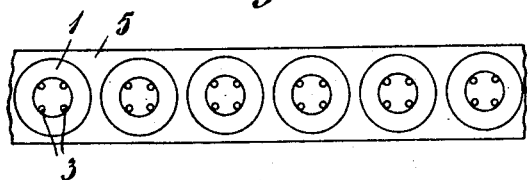
Fig.8.
Fig.9.
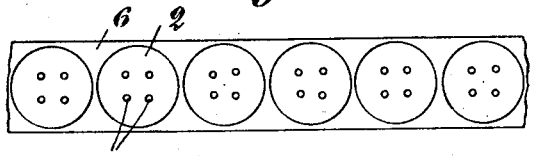
Fig.10.
Inventor
G. C. EKSTRÖM. AND
B. A. E. JOHNSON.
By Marks&Clerk
Attys.

Patented Jan. 1, 1929.

1,697,558

UNITED STATES PATENT OFFICE.

GUNNAR CHRISTIAN EKSTRÖM, OF STOCKHOLM, AND BROR ANDERS EMIL JOHNSON, OF APPELVIKEN, SWEDEN, ASSIGNORS TO ÖSTERGÖTTANDO ENSKILDA BANK, OF LINKOPING, SWEDEN, A CORPORATION OF SWEDEN.

MACHINE FOR MAKING BUTTONS AND THE LIKE.

Application filed October 30, 1924. Serial No. 746,875.

This invention relates to machines for making buttons or the like of that type which consists of a top member or cap and a bottom member or bush, which members are connected with one another preferably by the edge of one of the members being turned over the edge of the second member. Machines for making buttons of the said type have been manufactured, in which the cap and the bush are mounted in two swingable carriers respectively, while occupying certain positions, the said carriers being then swung into positions, in which the ends of the carriers holding the button members are directed toward one another the members being then assembled on one of the carriers and the finished button removed from the same. After the performance of the said operations the carriers are returned in the reversed direction to the positions first mentioned for the receiving of the subsequent cap and bush respectively, which are then moved to the assembling position and so on. Preferably, the said machines are provided with tools, which form metals strips, in which the button members have been stamped and provided with holes, punch the said members and place the same in the carriers. While the carriers are in the assembling position and while they are returned from the same to the member receiving position, the said tools, evidently, must remain inactive, which involves the loss of a great deal of work. The object of this invention is to increase the output of the said machines. This object is gained by providing the machines or similar machines with a plurality of pairs of co-operating carriers, moving in endless paths, so that, while one pair of co-operating carriers is in the assembling position, another pair of co-operating carriers is in the button member receiving position, thus permitting a practically uninterrupted operation of the machine.

In the accompanying drawings a machine arranged in accordance with this invention and adapted for the manufacturing of buttons is shown as an example. Fig. 1 is a side view of two sets of co-operating carriers, moving in circular paths, and of two sets of tools, co-operating with the sets of carriers respectively. Fig. 2 shows in a top view one of the said sets of carriers and its driving mechanism. Fig. 3 is a section on the line III—III of Fig. 1. Fig. 4 shows in a side view, partially in section, and on a greater scale the said carriers. Fig. 5 shows in a vertical section, the tools co-operating with the left carrier in Fig. 4. Fig. 6 shows a detail. Figs. 7 and 8 show in a top view and in a longitudinal section respectively a portion of a metal strip from which the top members or caps of the buttons are punched. Figs. 9 and 10 show in the same manner a portion of a metal strip, from which the bottom parts or bushes of the buttons are punched. Figs. 11 and 12 show a top view and a transverse section respectively of a finished button.

The button shown in Figs. 11 and 12 comprises a cap 1 and a bush 2 provided with four holes 3 and 4 respectively and fixed to one another by the edge of the cap 1 having been turned over the edge of the bush 2. The cap 1 is punched from a metal strip 5, Figs. 7 and 8, in which the cap previously has been stamped and provided with its holes. Also the bush 2 is punched from a metal strip 6, Figs. 9 and 10, in which the cap previously has been stamped and provided with its holes. The caps and bushes may be stamped in the strips and provided with holes either in special machines or in the same machine, in which the cap and bush are punched from the strips and assembled into a finished button. For that reason only the carriers and the tools co-operating with the same are shown in the drawings.

7, 7 . . ., Figs. 1, 4 and 5, are carriers for the caps and are moved in a circular path, and 8, 8 . . . are carriers for the bushes, moved also in a circular path. The construction of the said carriers is described below. The strips 5 and 6 from which the caps and bushes are punched, are fed from the left and the right respectively, Fig. 1, by any suitable, positively operating mechanisms. The punching devices 9 and 10 for the said strips are of substantially the same construction, for which reason it may be sufficient to describe only the device 9. The said device comprises three slides 11, 12 and 13. Slide 11 is movable in a sleeve-shaped casing 14 fixed to the frame A of the machine and carries a sleeve-shaped punch 15, co-operating with the edge 16 of a ring-shaped die 17 fixed to the casing 14 by means of a screw-threaded cap 18. The second slide 12 carries a sleeve-shaped plunger 19, which co-operates with an inner, narrower part 20 of the die 17, the diameter of the said part 20 being equal to the diameter of the cap 1, Figs. 11 and 12. The said plunger 19 is provided with two tapering pins 21 adapted to enter into two diametrically opposite holes of the cap blank, Figs. 7 and 8. Inside the slide 12 and the plunger 19 the third slide 13 is slidable, said slide consisting of a rod which at its top end carries two tapering pins 22, adapted to enter into the two remaining holes of the cap blank. The strip 5 is fed through a space 23, provided in the top end of the casing 14, below the die 17, and in such manner, that the cap blanks are successively located in the space 23, right above the punch 15. As a cap blank is in the said position, the punch 15 together with the plunger 19 and the rod 13 are moved upwards substantially simultaneously. During the said movement the punch 15 together with the edge 16 of the die 17 cuts the cap blank from the strip 5. The cap blank is then pushed by the plunger 19 into the narrower part 20 of the die 17 and through the same, during which operation the edge of the cap blank is bent downwards, constituting a flange on the cap. At the same time the pins 21, 22 enter the holes of the cap, holding the cap in a fixed position. As the cap has been forced through the die 17, the slide 12 together with the plunger 15 descends, while the rod 13 is moved for further distance upwards, the pins 22 of the said rod bringing with themselves the cap. While the cap is thus moved upwards, one of the carriers 7 is located right above the same, so that the cap is pushed by the pins 22 of the rod 13 on two pins 24 provided on the end of the said carrier and pointing downward, said pins 24 being so located, that they enter the holes of the cap, from which the pins 21 previously have been withdrawn. Each of the said pins 24 has a longitudinal-groove, in which a curve-shaped spring 25 is fixed, Fig. 6, said springs 25 being adapted to engage the cap pushed on the pins 24 by the pins 22, which then descend by the rod 13 being lowered. The said pins 24 together with the springs 25 will hold the cap while moved to the assembling position. The end of the carrier 7 is concave in conformity with the shape of the cap 1.

The bush blanks are cut from the strip 6 and placed in the carriers 8 respectively by the punching device 10, which is of substantially the same construction as the punching device 9. Owing to the fact however, that the edge of the bush is not bent, no such tool as the plunger 19 is provided in the device 10. After the bush has been cut from the strip 6 the bush is pushed by a rod, corresponding to the rod 13 and provided preferably with four tapering pins engaging the holes of the bush into one of the carriers 8, which at the proper moment is located right above the punching device 10 and directed downwards, Fig. 1. Each of the carriers 8 is provided for instance with four jaws 26 actuated by springs 27, Fig. 4, said jaws having a notch 26$^\times$ adapted to engage the bush pushed into the space between the jaws and then to hold the bush while moved to the assembling position.

Carriers 7 and 8 are located in sleeves 28 and 29 respectively provided on the side of toothed wheels 30 and 31 respectively and made integral with the same, said sleeves extending in radial directions from the centre of respective wheels. The toothed wheel 30 is rotatable on a shaft 30$^\times$ fixed in the frame of the machine and engages the toothed wheel 31, which is journaled in the manner stated below and rotated by a mechanism to be described. According to the drawings, each wheel is provided with eight sleeves 28 and 29 respectively equally spaced round the wheels. The diameters of the wheels 30 and 31 have the same length, so that, after the wheels 30 and 31 have been so adjusted, that two carriers 7 and 8 meet at the engaging place of the wheels, two carriers will always meet at the said place during the rotation of the wheels, one carrier 7 and one carrier 8 being simultaneously located above the punching devices 9 and 10, in proper position for receiving a cap and a bush.

Carrier 8 together with the jaws 26 are supported on a slide 32, Fig. 4, which is movable in the sleeve 29 and acted upon by a spring 33, tending to move the slide 32 inwards towards the axis of the toothed wheel 31. The end surface of the carrier is concave in conformity with the shape of the bush 2.

Toothed wheel 31 has a sleeve-shaped hub 34, Fig. 3, and is journaled in the frame of the machine. On the said hub 34 a ratchet wheel 35, Figs. 1 and 3, is fixed, with which a pawl 36 co-operates. The said pawl 36 is carried by an arm 37, swingable on the hub 34 and connected with the rod 38 of an eccentric disc 39, fixed on a transverse shaft 40, which by means of a bevel wheel gearing 41, 42 is rotated by the driving shaft 43 of the machine.

The stroke of the pawl 36 is so adapted, that the pawl engaging one of the notches of the ratchet wheel 35 rotates the toothed wheel 31 and thus the wheel 30 through a distance equal to the distance between the carriers 7 and 8 respectively, so that a carrier 7 and a carrier 8 will be located opposite one another for the assembling of the button members located on the said carriers. In the hub 34 a spindle 44 is journaled, which carries a cam disc 45, adapted to actuate the slides 32. An arm 46 is fixed to the said spindle 44 and connected by a link 47 with an arm 48 swingable on a pin 49 fixed in the frame of the machine. Said arm 48 carries a roller 50, which by a spring, not shown, is forced against a cam disc 51 fixed to the shaft 40.

While two carriers 7 and 8 are in the assembling position, the slide 32 of the carrier 8 is moved towards the carrier 7 by the cam disc 45 actuating the slide 32. During the said movement the bush held by the jaws 26 is pushed on the pins 24 of the carrier 7, said pins 24 entering the holes of the bush, so that the cap and the bush now are held in a fixed position relatively to one another. At the same time the bush enters the cap and is pressed against the same, enclosed by the flange of the cap. During the said operations the jaws 26 slide on the conical carrier 7 and are thus disengaged from the bush. At the end of the movement of the carrier 8 towards the carrier 7 the flange of the cap is bent over the edge of the bush by the concave end surface of the carrier 8, cap and bush being thus firmly connected and the button finished. While the slide 32 passes the cam 45 in order to be acted upon by the same, the cam 45 is turned through a short distance upwards, Fig. 4, or in a direction opposite to that in which the slide is rotated, said turning being effected by the cam 51 and by means of the members 48, 47 and 46. This results in the slide 32 being moved more rapidly outwards and the assembling of the button members being accelerated.

A central rod 51' is slidable in the carrier 7 longitudinally of the same and is held in an inner position by a spring 52, Fig. 4. While the toothed wheel 30 is rotated, the said rod 51' strikes a stationary cam disc 53, Fig. 1, fixed on the shaft 30ˣ, so that the rod 51' is pushed outwards and removes the finished button from the pins 24 of the carrier 7.

As two carriers 7 and 8 have been brought into the position to receive a cap and a bush from the punching devices 9 and 10, two teeth 54 and 55 fixed on the shaft 43 and each constituting a section of a ring enter into the space between two teeth of the wheels 30 and 31 during the continual rotation of the shaft 43 and are then withdrawn. The width of the said teeth 54 and 55 is equal to the width of the spaces between the teeth of the wheels 30 and 31 and the front end of each tooth 54 and 55 is wedge shaped, Fig. 1, so that the teeth 54 and 55 can be forced into the said spaces. In this manner the position of the carriers is fixed and the carriers are then firmly held in their positions, so that the members of the punching devices 9 and 10 will co-operate with the carriers 7 and 8 respectively and the members of the carriers 7 and 8 located in the assembling position will co-operate in the proper manner.

As the cap-blank and the bush-blank have been punched from the strips 5 and 6 respectively the wasted end of each strip is cut off by a knife 56 pivoted at 57, Fig. 3, and co-operating with a stationary knife 58. The cutting off devices are of the same construction. Knife 56 is actuated by a two-armed lever 59 pivoted at 60 and acted upon by a cam disc 61 fixed on a shaft 62, which is rotated from the shaft 43 in any suitable manner, and by a return spring 59ˣ. For the shifting of the slides 11, 12 and 13 in the manner stated above a cam disc 63, an eccentric disc 64 and a cam disc 65 are fixed to the shaft 62 and actuate lever arms 66, 67 and 68 respectively pivoted to the frame of the machine. The said lever arms 66 and 67 are fork-shaped and engage pins 69 and 70 respectively provided on the slides 11 and 12, while the lever arm 68 actuates the end of the slide or rod 13 against the action of a return spring 71. A spring, not shown, returns the lever-arm 66 and the slide 11.

From the above description and from the drawings is perceived that, while the button members are assembled and connected with one another forming a finished button, fresh button members during the same period are mounted at the punching devices on two other co-operating carriers, which members are then transported to the assembling position. Consequently, no time is spent unutilized while the carriers pass from the assembling position to the punching devices, owing to which fact the efficiency and the output of the machine considerably increased.

Machines arranged in accordance with this invention may be used also for the manufacturing of rattles and other similar articles. The carriers described may be combined also with other means than those shown in the drawings for providing the carriers with the members constituting the button or similar article.

The invention may, evidently, be modified in some respects without exceeding the limits of the same.

We claim:

1. In a machine for making buttons or the like comprising a top part or cap and a bottom part or bush, the combination of two sets of cap and bush carriers respectively, each set comprising a plurality of carriers moving in an endless path and co-operating with the carriers of the other set, slides on which the carriers respectively of the one set are provided, cam surfaces located in the paths respectively of the said carriers, the cam surface belonging to the one set of carriers actuating the slides of the said set when located in the position for the assembling of the cap and bush on the carrier of the second set, and the other cam surface actuating a member for removing the button from the carrier last mentioned.

2. In a machine for making buttons or the like comprising a top part or cap and a bottom part or bush, the combination of two rotatable discs or the like, cap and bush carriers provided on the said discs respectively, means moving the discs stepwise for bringing the carriers into position for the assembling of the cap and bush, slides, on which the carriers of the one set are provided, cam surfaces located in the paths respectively of the carriers, the cam surface belonging to the one set of carriers actuating the slides of the said set when located in the position for the assembling of the cap and bush on the carrier of the second set, and the other cam surface actuating a member for removing the button from the said carrier, and means for fixing the carriers in their operative positions.

In witness whereof we have hereunto signed our names.

GUNNAR CHRISTIAN EKSTRÖM.
BROR ANDERS EMIL JOHNSON.